United States Patent

Mitchell et al.

Patent Number: 5,854,730
Date of Patent: Dec. 29, 1998

[54] TRANSIENT AND VOLTAGE SURGE PROTECTION SYSTEM AND METHOD FOR PREVENTING DAMAGE TO ELECTRICAL EQUIPMENT

[76] Inventors: Dennis Mitchell, 10362 Sahara, #2816, San Antonio, Tex. 78216; Joseph Muñoz, 21507 Tenore, San Antonio, Tex. 78259

[21] Appl. No.: 931,009

[22] Filed: Sep. 15, 1997

[51] Int. Cl.[6] .................................................. H02H 7/04
[52] U.S. Cl. .................. 361/38; 361/35; 361/41; 361/111; 361/56
[58] Field of Search ................................. 361/35, 38, 39, 361/41, 56, 91, 111, 117, 118

[56] References Cited

U.S. PATENT DOCUMENTS

| | | | |
|---|---|---|---|
| 4,023,071 | 5/1977 | Fussell | 361/56 |
| 4,760,485 | 7/1988 | Ari et al. | 361/54 |
| 4,802,055 | 1/1989 | Beckerman | 361/56 |
| 4,975,797 | 12/1990 | Ververka et al. | 361/35 |
| 5,136,455 | 8/1992 | Billingsley | 361/56 |
| 5,317,469 | 5/1994 | Lu | 361/40 |
| 5,353,189 | 10/1994 | Tomlinson | 361/118 |
| 5,388,021 | 2/1995 | Stahl | 361/56 |
| 5,414,587 | 5/1995 | Kiser et al. | 361/118 |
| 5,532,897 | 7/1996 | Carpenter, Jr. | 361/118 |
| 5,537,044 | 7/1996 | Stahl | 324/511 |
| 5,617,284 | 4/1997 | Paradise | 361/58 |

Primary Examiner—Jeffrey Gaffin
Assistant Examiner—Kim N. Huynh
Attorney, Agent, or Firm—Royston, Rayzor, Vickery, Novak & Druce

[57] ABSTRACT

A voltage surge suppression system for the protection of electronic equipment from damage from voltage surges and voltage transients has at least one metal oxide varistor electrically connected to a primary power source; a transformer; at least one second metal oxide varistor electronically connected between said transmission interceptor and a power circuit board; and a circuit opener electronically connected between the a transformer and power circuit board; wherein the a transformer is connected between the primary power source and second metal oxide varistor. The circuit opener is a resettable breaker for protecting the transformer from surges greater than the rated value of the second metal oxide varistor by opening in order to close off current flow.

11 Claims, 3 Drawing Sheets

TRANSIENT AND VOLTAGE SURGE PROTECTION SYSTEM AND METHOD FOR PREVENTING DAMAGE TO ELECTRICAL EQUIPMENT

FIELD OF THE INVENTION

This invention relates generally to the field of voltage surge protection or elimination. More particularly, it relates to the protection of equipment from high voltage surges and transients such as those caused by lightning discharges, birds, small animals, or branches touching power lines. Even more specifically, this invention relates to the protection of equipment such as the heating, ventilation, and air conditioning (HVAC) system of a personal or commercial residence.

BACKGROUND OF THE INVENTION

Electrical equipment can be damaged by variations in the power line electrical transmission due to events such as voltage surges, transients and atmospheric discharges which are conducted through those lines in reaching the equipment. These large sudden changes in the line voltage usually last only fractions of a second, yet are long enough to short, open or ground out any line voltage loads. Surge protection devices typically found in the art and used in protecting equipment from these line variations include capacitors, gas tubes and metal oxide varistors (MOV's).

Gas tubes contain hermetically sealed electrodes which release gas during use, so that the gas impairs the operating characteristics appreciably. By releasing the gas, the breakover or breakdown voltage is lowered. This breakdown voltage varies and is dependent upon the rise time of the applied surge. As a result, depending on the applied transient, several microseconds may elapse before a typical gas tubes arcs over, leaving the leading portion of the surge or surge remnant, intact to be passed on to the operating equipment. Another problem with gas tubes is that current from the power source continues flowing through the gas tube after the surge current terminates. In ac circuits, this follow-on current clears when the line current goes through zero, but may reignite on the next cycle. DC circuits require a separate means for extinguishing the arc, such as an MOV in series with the gas tube.

Capacitors block the flow of direct current and permit the flow of alternating current to a degree dependent upon the capacitor's capacitance and the current frequency. Placed across a power line, the capacitor acts as a type of surge filter. The impedance of the capacitor forms a voltage divider with the surge source impedance. This results in the attenuation of transients at high frequencies, with the higher the capacitance value, the greater the attenuation.

MOV's are typically utilized as voltage limiting elements in electrical circuits. These devices clamp when a voltage transient occurs that exceeds the line voltage by a sufficient amount. As the transient rises, the nonlinear impedance of the MOV creates a spike current through it which rises faster than the voltage across it, thereby producing its clamping action. In the case of voltages less than the MOV's pickup voltage at which it becomes conducting, the MOV essentially behaves as a capacitor.

The above types of surge protectors serve in protecting various electrical equipment such as HVAC equipment by opening a circuit that supplies control voltage to all control voltage loads thereby preventing the equipment from being damaged by the surge or transient. However, the surge protection designs available do not take into consideration both the electrical equipment to be protected and the most widely used power source for supplying electricity or control voltage to that residential and commercial equipment, that being the step-down transformer or transmission interceptor. In this type of transformer, the alternating-current voltages of the secondary windings are lower than that of the primary windings. The secondary power source provides power from the transformer to the equipment, while the primary power source is found in the line voltage.

SUMMARY OF THE INVENTION

The present invention includes features and/or components that have been invented and selected for their individual and combined benefits and superior performance. The invention provides a method of preventing damage to both residential or commercial electrical equipment, such as HVAC units, and their step-down transformers by providing a simple and cost effective surge arrestor system attachable to incoming ac lines.

The most widely used power source for HVAC residential and light commercial control voltage is the step-down transformer. The primary side of the transformer is wired to the line voltage and typically has no type of surge protection. Likewise, the secondary side of the transformer can be damaged or fail open when a short occurs in the control voltage circuit of the electrical equipment being supplied power by the transformer. The present invention provides a method and apparatus for preventing damage to either side of the transformer by utilizing MOV's to clamp down on power surges that occur either upstream or downstream of the transformer. In doing so, damage to electrical equipment supplied with power from the transformer is prevented or minimized.

By placing MOV's both upstream and downstream of the transformer, the risk of damage to the electrical equipment due to voltage surges and transients is minimized. MOV's placed upstream of the transformer protect the transformer from power surges or transients that occur along the line source. With MOV's placed downstream of the transformer, the flow of any surge or transient that occurs due to fault conditions past the transformer is clamped by the MOV thereby not allowing this surge to pass on to the circuit board. Should the surge be greater than the rated value of the MOV, the invention may also utilizes a resettable fuse which will open up when a current higher than its rated holding current occurs, thereby protecting the transformer from surges from its secondary side.

Additionally, the present invention provides for a circuit opener that may either be a manual reset breaker or resettable fuse, depending upon current ratings, that allows power to be returned to the electrical equipment once the voltage conditions are back to normal. The circuit opener supplements the downstream MOV in protecting the transformer once the MOV shorts out. Resetting of the breaker is accomplished by a manual switch while the resettable fuse resets automatically. Both types of circuit openers allow for a reduction in service calls. Because of its simplicity in design and minimal usage of parts, the present invention also reduces overall costs in comparison to other surge protection devices.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

Figure 1:
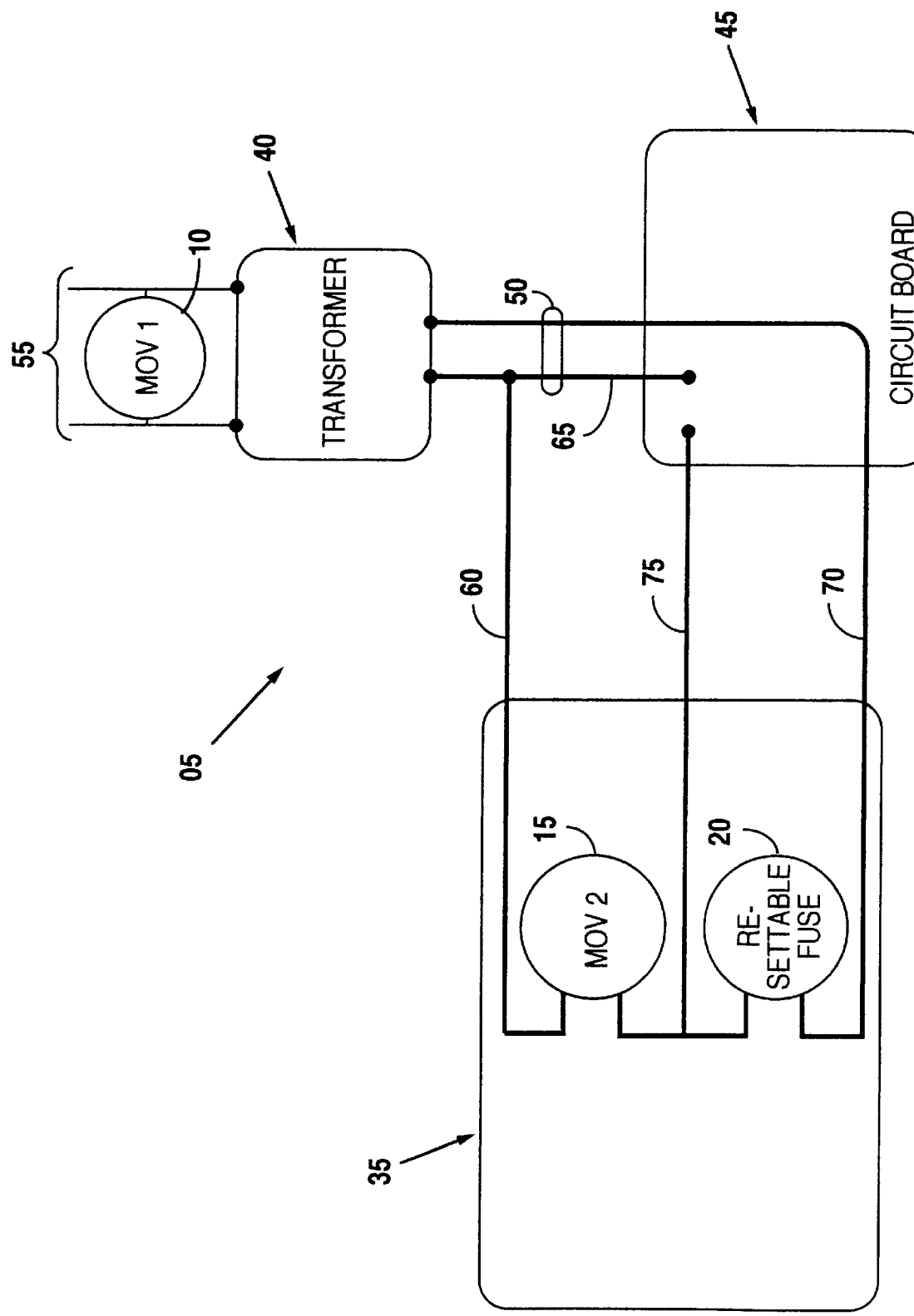
FIG. 1 is a schematic drawing of one embodiment of the surge protection device of the present invention illustrating the downstream MOV and a resettable fuse contained within the same housing.

As required, detailed embodiments of the present invention are disclosed herein. However, it is to be understood that the disclosed embodiments are merely exemplary of the invention that may be embodied in various and alternative forms. Additionally, the figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art methods to variously employ the present invention.

Certain terminology will be used in the following description for convenience and reference only and will not be limiting. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, not necessarily in contact with each other. Normally there will be an absence of other components positioned therebetween, but this is not a requirement.

Still further, some structural relationships or orientations may be designated with the word "substantially". In those cases, it is meant that the relationship or orientation is as described, with allowances for variations that do not effect the cooperation of the so described component or components.

Figure 4:
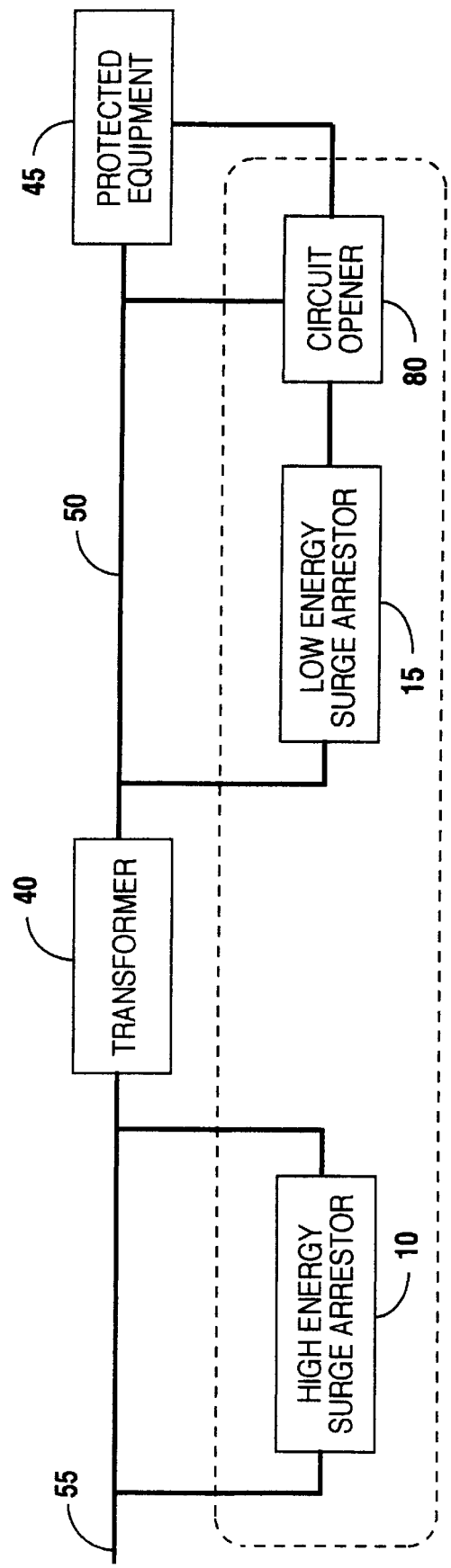
FIG. 4 is a high level schematic of a system containing a high energy surge arrestor connected in parallel upstream of a step-down transformer and a low energy surge arrestor and connected in parallel and circuit opener connected in series downstream of the transformer and upstream of the protected circuit.

The present invention provides both a method and device for preventing damage to electrical equipment due voltage surges and transients such as those caused by lightning strikes or collapse of a magnetic field. As generally shown in FIG. 4, the present invention is comprised of a high energy surge arrestor 10 connected to a primary power source 55 upstream of a transformer 40, with a low energy surge arrestor 15 connected to a secondary power source 50 downstream of the transformer 40 and upstream of the equipment 45 being protected from surges and/or transients. Also located between the transformer 40 and equipment 45 is a circuit opener 80 connected to the secondary power source 50. This opener 80 may be a resetable fuse or breaker.

Referring to FIG. 1, a schematic of the present surge suppression system 05 is shown. The invention includes a MOV 10 connected in parallel to a primary power source 55 with another MOV 15 connected in parallel to a secondary power source 50. Positioned between the MOV's is a transformer 40 for providing power from the primary transmission line 55 to the secondary line 50 for powering the electrical equipment 45. As illustrated in FIG. 1, the primary MOV 10 is contained within a housing 35 separate from the secondary MOV 15. The secondary line 50 is connected in series to the electrical equipment 45 by a common input line 60 to the MOV 15 and a load or phase output line 75 from the MOV 15 to the electrical equipment 45. In normal conditions output is through the common output line 65.

Normally, the voltage across the primary source will be greater than that across the secondary source. Accordingly, in such instances the voltage rating of the primary MOV 10 will differ and be of a greater voltage rating than the voltage rating of the secondary MOV 15. For example, the voltage of the primary transmission line 55 may be 115 volts, whereas the voltage of the secondary power line 50 may be only 24 volts. In such a situation, the primary side 55 of the transformer 40 may require an MOV 10 with a circuit voltage of 125 volts, a maximum allowable voltage of 200 volts and clamping voltage of 400 volts, whereas the secondary side 50 may only require an MOV 15 with a circuit voltage of 28 volts, maximum allowable voltage of 35 volts and a clamping voltage of 103 volts.

FIG. 1 further illustrates a resettable fuse 20 for additional equipment protection. The fuse 20 is wired in series from one side of the secondary voltage 50 to the power circuit board 45 of the equipment by means of a load or phase input line 70 and load or phase output line 75 and interrupts the flow of dangerously high current during fault conditions. In those instances where the voltage surge is greater than the maximum allowable voltage of the MOV 15 thereby shortening out the MOV 15, the fuse 20 opens up preventing damage to the secondary side of the transformer 40. The fuse 20 remains open until the short in the circuit board 45 or control voltage wiring 50 is eliminated. Following the above example where the the secondary MOV 15 is rated at a maximum allowable voltage of 35 volts and the fuse 20 is rated at 1.6 amps, should a surge of 40 volts occur across the secondary power source, the secondary MOV 15 will short at 35 volts. Once the MOV 15 shorts out, the amperage may increase, possibly to as much as eight amps, causing the fuse to open. By such manner of protection, the MOV 15 is able to protect the equipment 45 and the fuse 20 protects the transformer 40. The fuse 20 is preferably a solid state device that resets once the fault is cleared, thereby reducing warranty service and repair costs.

Figure 2:
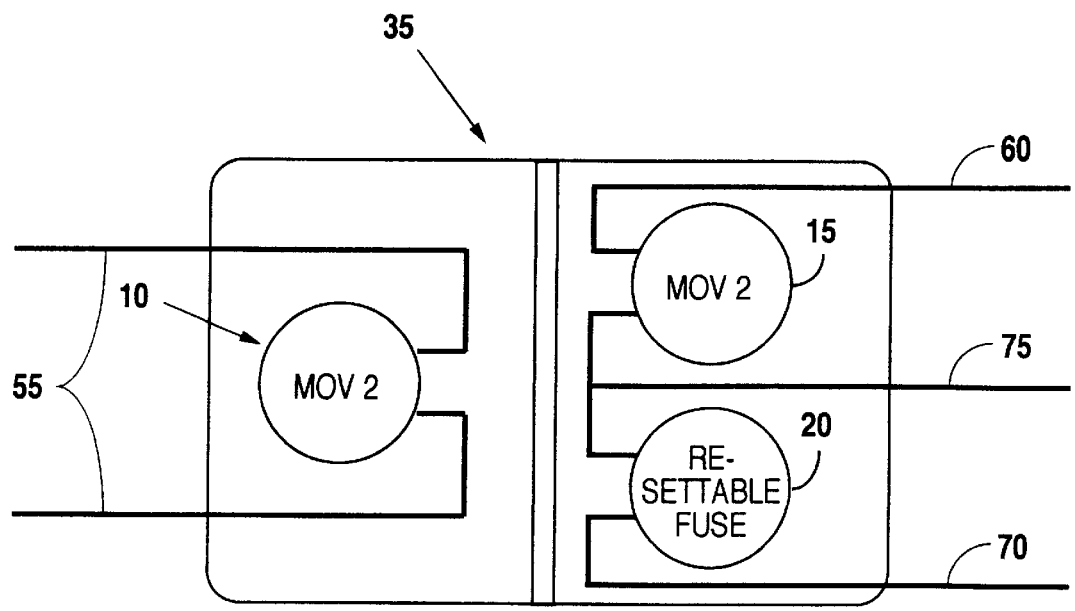
FIG. 2 is a schematic drawing of another preferred embodiment of the surge protection device of the present invention with the upstream MOV contained within the same housing as the downstream MOV and a resettable fuse.

FIG. 2 illustrates the preferred embodiment of the present invention. As shown therein, the primary MOV 10 is contained within the same housing 35 as the secondary MOV 15 and resettable fuse 20. This configuration allows all parts of the present invention to be centrally placed at one location thereby simplifying inspection and repair.

The first MOV 10 functions as the primary circuit protection to the transformer 40 from any surge or transient that may occur upstream of the transformer 40 within the MOV's 10 specified rating. Under normal operation, as long as the voltage through the primary line 55 is below a predetermined level, the MOV 10 presents a high resistance. During a fault, the MOV 10 starts conducting thereby preventing the voltage from passing to the transformer 40. As long as the fault exists, current flows into the MOV 10. Once the voltage passes back below the MOV 10 protection voltage level, the MOV 10 again offers a high resistance with current flowing to the transformer 40. For surges greater than the MOV's 10 rating, the MOV 10 shorts or clamps down, thereby stopping current flow to the transformer 40 before it is damaged.

Likewise, should there be a surge across the secondary power source 50 or from the equipment circuit board 45, the secondary MOV 15 will function in the same manner as the primary MOV 10 to protect the transformer 40 or the circuit board 45. In the event that the surge is greater than the rating of the MOV 15, the fuse 20 will open up to interrupt current flow. Both the MOV 15 remains shorted and the fuse 20 open until the current returns back below to the safe level.

In the preferred embodiment illustrated by FIG. 2, both the upstream or primary MOV 10 are contained within the same housing 35 as the downstream or secondary MOV 15 and fuse 20. By keeping all components within the same housing 35, any repair or replacement of parts can be easily and quickly accomplished. In another embodiment illustrated by FIG. 1, the primary MOV 10 may be connected to the primary power source 55 separate from the secondary MOV 15 and fuse 20. This would minimize the amount of wiring required to connect the primary MOV 10 upstream of the transformer 40.

Figure 3:
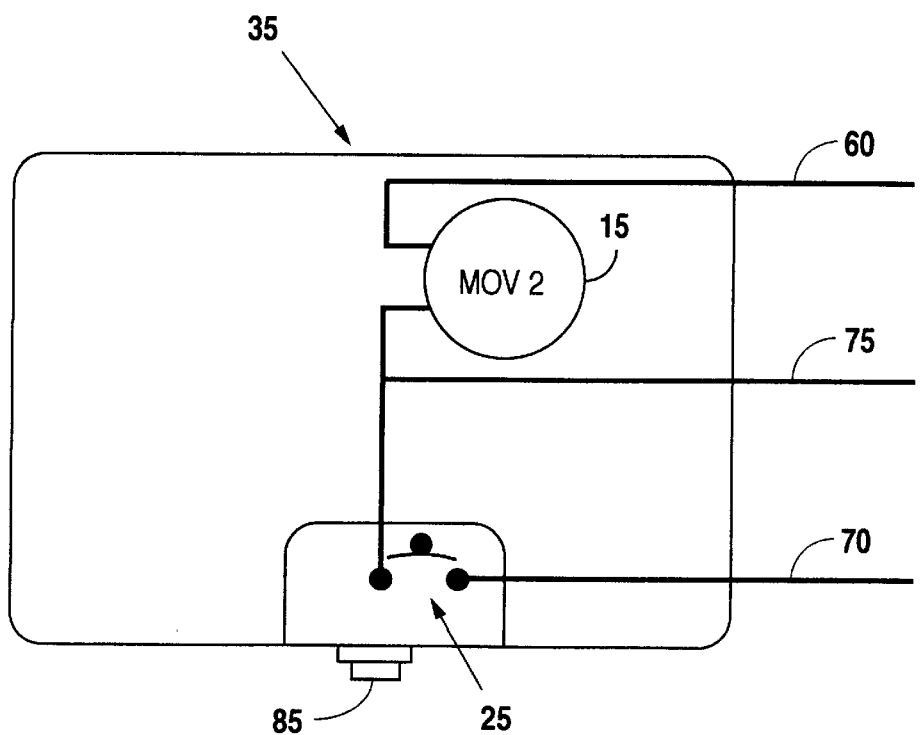
FIG. 3 is a schematic drawing of another embodiment of the surge protection device of the present invention illustrating a manual reset breaker connected in series within the same housing as the downstream MOV.

FIG. 3 illustrate another embodiment more suitable for larger commercial applications. In contrast to FIGS. 1 and 2, FIG. 3 illustrates the utilization of a reset breaker 25 and manual reset switch 85. Typically, a reset breaker 25 is of a higher voltage rating than the resettable fuse and is used in those instances in which the current through the secondary power source 50 is greater than the voltage rating of the resettable fuse. Although not illustrated in FIG. 3, it should be understood that the primary MOV 10 may also be contained within the same housing 35 as the secondary MOV 15 and breaker 25.

In those instances where a surge does occur, the system performs as following. For surges occurring upstream of the transformer 40, the primary MOV 10 provides protection to the transformer 40 by going to a short thereby preventing the excess voltage from accessing and damaging the transformer 40. Once the line voltage has returned to normal, the MOV 10 returns to resisting voltage allowing current to flow to the transformer 40.

Should the voltage surge occur downstream of the transformer 40, the secondary MOV 15 will act to prevent the surge from traveling to the circuit board 45 or equipment by also going to a short. For those surges or transients greater than the MOV's maximum allowable voltage, the MOV 15 shorts out not allowing any voltage to pass on to the circuit board 45.

When the secondary voltage returns to normal, the MOV 15 begins resisting voltage again permitting voltage to flow to the circuit board 45.

In those cases of flow back to the transformer 40 from the circuit board 45, the fuse 20 will open at its predetermined trip current thereby breaking all control voltage and protecting the transformer 40 from failing. Trip time is based upon the amperage of the surge, such that the higher the amperage, the quicker the trip time. Once opened, the fuse 20 breaks all control voltage through the secondary source 50 and remains open until the short is eliminated. When the short is removed, the fuse 20 will automatically reset. If a manual reset breaker 25 is utilized as illustrated in FIG. 3, the breaker 25 will need to be manually engaged by a reset switch 85 in order to reactivate the breaker 25.

In those situations where the voltage across the secondary power source 50 reaches the trip rating of the primary MOV 10, the primary MOV 10 will begin to short thereby supplanting the need for the secondary MOV 15 and the resettable fuse 20 or breaker 25. By this action of the primary MOV 10 shorting out at the primary power source 55, current through the secondary power source 50 is eliminated. With a return to normal of the line voltage, the primary MOV 10 will then return to resisting voltage and thus allowing current flow to return to the transformer 40. Power is then restored to normal to the secondary power source 50 with the secondary MOV 15 returning to resisting voltage and the fuse 20 resetting or the breaker 25 awaiting to be manually reset.

As shown above, the present invention both reduces the number of components for residential or light commercial equipment and reduces the costs for the consumer. These and other variations, which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A voltage surge suppression system for the protection of electronic equipment from damage from voltage surges and voltage transients, said system comprising:
    a metal oxide varistor electrically connected to a primary power source;
    a transformer;
    a second metal oxide varistor electronically connected between said transformer and a power circuit board; and
    a circuit opener electronically connected between said transformer and power circuit board, said circuit opener being a resettable breaker for protecting said transformer from surges greater than the rated value of said second metal oxide varistor by opening in order to close off current flow, wherein:
        said transformer is connected between said primary power source and second metal oxide varistor.

2. The surge suppression system as recited in claim 1 wherein said circuit opener is able to be reset automatically.

3. The surge suppression system as recited in claim 1 wherein said breaker is connected to a reset switch which allows the breaker to be reset manually.

4. The surge suppression system as recited in claim 1, further comprising a housing for containing said second metal oxide varistor and circuit opener.

5. The surge suppression system as recited in claim 4 wherein said housing further comprises a reset switch for resetting said circuit opener.

6. The surge suppression system as recited in claim 1 wherein said first and second metal oxide varistors are of different voltage ratings.

7. A method of preventing damage to electrical equipment due to voltage surges and voltage transients comprising:
    providing a first metal oxide varistor upstream of a transformer, said metal oxide varistor being connected in parallel with a primary voltage source and said transformer;

providing a second metal oxide varistor downstream of said transformer, said second metal oxide varistor being connected in parallel with a secondary voltage source and said transformer;

providing a circuit opener downstream of said transformer, said circuit opener being connected in series with said secondary voltage source, said circuit opener being a reset breaker for protecting said transformer from surges greater than the rated value of said second metal oxide varistor by opening to close off current flow; and utilizing said first metal oxide varistor, second metal oxide varistor and said circuit opener to protect electrical equipment from damage by clamping and breaking voltage surges and transients.

8. The method as recited in claim 7 wherein said breaker automatically closes once the voltage surge is eliminated.

9. The method as recited in claim 7 further providing a reset switch for manually reactivating said breaker.

10. The method as recited in claim 7 wherein said first metal oxide varistor is of a different voltage rating than said second metal oxide varistor.

11. The method as recited in claim 7 further comprising supplanting the function of the second metal oxide varistor and circuit opener with said first metal oxide varistor where the surge is greater than the trip rating of said first metal oxide varistor.

* * * * *